US008757449B2

(12) United States Patent
Ikushima

(10) Patent No.: US 8,757,449 B2
(45) Date of Patent: Jun. 24, 2014

(54) AIR BUBBLE INGRESS PREVENTION MECHANISM, LIQUID MATERIAL DISCHARGE DEVICE PROVIDED WITH THE SAME, AND LIQUID MATERIAL DISCHARGE METHOD

(75) Inventor: Kazumasa Ikushima, Mitaka (JP)

(73) Assignee: Musashi Engineering, Inc., Tokyo (JP)

( * ) Notice: Subject to any disclaimer, the term of this patent is extended or adjusted under 35 U.S.C. 154(b) by 122 days.

(21) Appl. No.: 13/498,221

(22) PCT Filed: Sep. 22, 2010

(86) PCT No.: PCT/JP2010/066411

§ 371 (c)(1),
(2), (4) Date: May 9, 2012

(87) PCT Pub. No.: WO2011/037139

PCT Pub. Date: Mar. 31, 2011

(65) Prior Publication Data

US 2012/0217262 A1 Aug. 30, 2012

(30) Foreign Application Priority Data

Sep. 25, 2009 (JP) ................................ 2009-220868

(51) Int. Cl.
*G01F 11/00* (2006.01)

(52) U.S. Cl.
USPC ............... 222/309; 222/1; 222/340; 222/380; 222/542

(58) Field of Classification Search
USPC .............................. 222/1, 309, 334, 340, 542
See application file for complete search history.

(56) References Cited

U.S. PATENT DOCUMENTS 3,807,909 A * 4/1974 St. Clair ........................ 417/517
5,309,958 A * 5/1994 Ueda et al. ...................... 141/90

(Continued)

FOREIGN PATENT DOCUMENTS

JP 08-001064 A 1/1996
JP 08-001064 U 7/1996

(Continued)

OTHER PUBLICATIONS

International Search Report for PCT/JP2010/066411, dated Dec. 21, 2010.

*Primary Examiner* — Frederick C Nicolas
(74) *Attorney, Agent, or Firm* — Westerman, Hattori, Daniels & Adrian, LLP

(57) ABSTRACT

Disclosed are an air bubble ingress prevention mechanism, a liquid material discharge device provided with the air bubble ingress prevention mechanism, and a liquid material discharge method, with which a constant filled state can be achieved without variations and without requiring any additional equipment when a metering section is filled with liquid material. A discharge device is provided with a metering section which has a flow passage communicating with a nozzle, and a plunger which moves back and forth within the flow passage of the metering section. The discharge device comprises an air bubble ingress prevention mechanism which can be mounted at the end of the metering section on the opposite side to the nozzle, and which includes: a first hole which communicates with the flow passage of the metering section, and within which the plunger moves back and forth; a first sealing member which is provided at the end of the first hole at the nozzle side; a second sealing member which is provided at the end of the first hole at the opposite side to the nozzle; and a second hole which communicates with the side face of the first hole.

18 Claims, 8 Drawing Sheets

(56) References Cited

U.S. PATENT DOCUMENTS

| | | | | |
|---|---|---|---|---|
| 5,400,927 | A * | 3/1995 | Marchadour | 222/380 |
| 5,747,102 | A * | 5/1998 | Smith et al. | 427/98.4 |
| 6,267,266 | B1 * | 7/2001 | Smith et al. | 222/1 |
| 7,134,617 | B2 * | 11/2006 | Ikushima | 239/584 |
| 7,484,642 | B2 * | 2/2009 | Bonney | 222/256 |
| 2010/0177138 | A1 | 7/2010 | Ikushima | |

FOREIGN PATENT DOCUMENTS

| | | | |
|---|---|---|---|
| JP | 11-156278 | A | 6/1999 |
| JP | 2005-183787 | A | 7/2005 |
| JP | 2006-043584 | A | 2/2006 |
| JP | 2009-106857 | A | 5/2009 |
| WO | 2007/046495 | A1 | 4/2007 |
| WO | 2007/080911 | A1 | 7/2007 |

* cited by examiner

AIR BUBBLE INGRESS PREVENTION MECHANISM, LIQUID MATERIAL DISCHARGE DEVICE PROVIDED WITH THE SAME, AND LIQUID MATERIAL DISCHARGE METHOD

TECHNICAL FIELD

The present invention relates to an air bubble ingress prevention mechanism, a liquid material discharge device provided with the mechanism, and a liquid material discharge method, which are adapted for use in a technical field of discharging a liquid material in constant amount from a nozzle by moving a plunger forwards within a metering section that is filled with the liquid material.

BACKGROUND ART

As one example of devices for precisely discharging various liquid materials in constant amounts, there is known a plunger type discharge device for discharging the liquid material in constant amount from a nozzle by moving a plunger (or a piston) forwards within a metering section (or a syringe) that is filled with the liquid material. With that type of discharge device, because the liquid material is discharged in amount corresponding to a volume displaced by the plunger moving forwards, the liquid material can be stably discharged with higher precision than other types of discharge devices. For that reason, the plunger type discharge device is used in a variety of fields, such as resin molding for electronic components and injection of an electrolyte for a cell.

In the plunger type discharge device, before the liquid material is discharged, particularly when the liquid material is filled into the metering section in an empty state, an operation of filling the liquid material into the metering section is performed. Such a filling operation may often cause a situation that air bubbles are generated in the metering section with a pressure reduction attributable to backward movement of the plunger, or that air bubbles remain in some portions, such as corners not filled with the liquid material. If air bubbles are mixed in the liquid material within the metering section, an amount of the discharged liquid material is not held constant with respect to the stroke of the plunger moving forwards and the liquid material cannot be discharged in precise constant amount due to an influence of compressibility of the air bubbles.

To cope with the problem of ingress (mixing or trapping) of air bubbles, various proposals have been made up to date. For example, Patent Document 1 discloses a method of purging out air in a dispenser comprising a liquid material supply container in which a liquid material is stored, and a liquid material discharge device including a supply port connectable to an opening of the liquid material supply container, a discharge port through which the liquid material is discharged, a flow passage interconnecting the supply port and the discharge port, a plunger disposed midway the flow passage, and an opening/closing mechanism for opening and closing the supply port and the discharge port, the method comprising the step of connecting the supply port of the vertically-reversed liquid discharge device to the opening of the vertically-reversed liquid material supply container, and a step of filling the liquid material supplied from the liquid material supply container into the flow passage.

Meanwhile, Patent Document 2 discloses a syringe in which a relief hole forming a gap relative to a piston sealing member is formed in a hole bottom of the syringe, a liquid is injected through a discharge port of the syringe in a state that a piston is pushed into the relief hole, and after discharging air to the outside through the gap formed by the sealing member and the relief hole, the piston is slightly withdrawn to make sealing active to close the gap, thereby filling the liquid into the syringe without discharging the liquid to the outside.

PRIOR ART LIST

Patent Document

Patent Document 1: Japanese Patent Laid-Open Publication No. 2005-183787

Patent Document 2: Japanese Utility Model Laid-Open Publication No. H8-1064

Patent Document 3: WO2007/046495

SUMMARY OF THE INVENTION

Problems to be Solved by the Invention

The technique described in Patent Document 1 develops a certain effect in preventing the ingress of air bubbles, but working efficiency is very poor. More specifically, with the method described in Patent Document 1, because the discharge device has to be vertically reversed, operations of mounting and dismounting the discharge device and the liquid material supply container are troublesome. Further, when a branched pipe is used, it is required to apply pressure to the liquid material supply container and to perform vacuum suction through the discharge port. In addition, a difficulty resides in automating the operations because of the need of vertically reversing the discharge device.

On the other hand, because of visually confirming whether the liquid is filled up to the sealing member or not, the syringe described in Patent Document 2 causes variations depending on operators and has a difficulty in automating operations. Further, if an operation after withdrawing the piston is mistaken, air bubbles may be sucked through a nozzle, or air bubbles may be generated inside the syringe due to a pressure reduction.

In a known plunger type discharge device, illustrated in FIG. 8, according to Patent Document 3, when a liquid material is filled into a metering section, a plunger is first withdrawn out and the liquid material is then overflowed to purge out air in the metering section, whereupon the end of filling of the liquid material is detected. Therefore, an upper end of the metering section is contaminated each time the liquid material is filled. Another problem is that when the plunger is inserted thereafter, air bubbles may be entrained. Still another problem is that, because operations of wiping out the overflowed liquid material and inserting the plunger are manually performed, the operations may take a time and variations may occur in a filled state depending on operators.

In view of the problems described above, an object of the present invention is to provide an air bubble ingress prevention mechanism, a liquid material discharge device provided with the mechanism, and a liquid material discharge method, which can realize a constant filled state free from variations without requiring any additional equipment when a liquid material is filled into a metering section.

Means for Solving the Problems

The inventor has accomplished the present invention as a result of conducting intensive studies on a shape of a flow passage in the metering section and control of a plunger position with intent to overcome the problem of a pressure reduction in the metering section caused with backward movement of a plunger, and the problem of air entrainment caused with forward movement of the plunger. Details of the present invention are as follows:

According to a first aspect of the present invention, there is provided an air bubble ingress prevention mechanism mountable to a discharge device, which comprises a metering section having a flow passage communicated with a nozzle and a plunger reciprocally movable in the flow passage of the metering section, at an end of the discharge device on the side away from the nozzle of the metering section, wherein the air bubble ingress prevention mechanism includes a first hole communicated with the flow passage of the metering section and allowing the plunger to reciprocally move therein, a first sealing member disposed at an end of the first hole on the side closer to the nozzle, a second sealing member disposed at an end of the first hole on the opposite side away from the nozzle, and a second hole communicated with a side surface of the first hole.

According to a second aspect of the present invention, in the first aspect of the present invention, an inner periphery of the first hole is greater than an outer periphery of the plunger.

According to a third aspect of the present invention, in the first or second aspect of the present invention, inner peripheries of the first and second sealing members are substantially equal in size to an outer periphery of the plunger, and outer peripheries of the first and second sealing members are greater than an inner periphery of the first hole.

According to a fourth aspect of the present invention, in any one of the first to third aspects of the present invention, an inner periphery of the second hole is smaller than an inner periphery of the first hole.

According to a fifth aspect of the present invention, in any one of the first to fourth aspects of the present invention, the air bubble ingress prevention mechanism further comprises a liquid receiving portion at an end of the second hole on the side away from the first hole.

According to a sixth aspect of the present invention, in any one of the first to fifth aspects of the present invention, in comparison with a space a that is defined by a fore end of the plunger and a horizontal plane at a position of an upper edge of an end of the second hole on the side communicated with the first hole when the plunger is at a most backward position, a space b is set to be greater which is defined by an inner peripheral surface of the first hole, an outer peripheral surface of the plunger, the first sealing member, and the horizontal plane at the position of the upper edge of the end of the second hole on the side communicated with the first hole when the plunger is at a position in contact with the first sealing member.

According to a seventh aspect of the present invention, there is provided a liquid material discharge device comprising the air bubble ingress prevention mechanism according to any one of the first to sixth aspects, a liquid material supply source for supplying a liquid material, a metering section including a flow passage communicated with a nozzle, a plunger reciprocally movable in the flow passage of the metering section, the nozzle having a discharge port through which the liquid material is discharged, and a selector valve for selectively establishing communication between the liquid material supply source and the metering section and communication between the metering section and the nozzle.

According to an eighth aspect of the present invention, there is provided a liquid material discharge method using the liquid material discharge device according to the seventh aspect, the method comprising a filling step of filling the liquid material into the metering section, and a discharge step of discharging the liquid material in the metering section from the nozzle, the filling step including a first step of moving the plunger backwards to a position between the position of the upper edge of the end of the second hole on the side communicated with the first hole and the second sealing member, a second step of supplying the liquid material to the metering section at least until the liquid material overflows from an end of the second hole on the side away from the first hole, and a third step of moving the plunger forwards until the plunger comes into contact with the first sealing member.

According to a ninth aspect of the present invention, in the eighth aspect of the present invention, the third step is executed without stopping the supply of the liquid material in the second step.

According to a tenth aspect of the present invention, in the eighth or ninth aspect of the present invention, a speed at which the plunger is moved forwards in the third step is set to be lower than a speed at which the plunger is moved forwards in the discharge step.

Advantageous Effect of the Invention

With the present invention, since the liquid material is filled in accordance with the shape of the flow passage and control of the plunger position, ingress of air bubbles into the metering section can be prevented without requiring any additional equipment, such as a vacuum suction device.

Further, since the filling operation is simple, even a person not skilled in the operation can also easily perform the operation, and a working time can be cut.

Still further, since the filling operation is simple and automatically performed, variations in the filled state of the liquid material depending on operators can be minimized.

MODE FOR CARRYING OUT THE INVENTION

The mode for carrying out the present invention will be described below.

It is to be noted that, in the following description, the side closer to the air bubble ingress prevention mechanism is called the “upward side” and the side closer to the metering section is called the “downward side” in some cases. Also, regarding a moving direction of a plunger, the movement in a downward direction is called the "forward" movement and the movement in an upward direction is called the "backward" movement in some cases.

[Air Bubble Ingress Prevention Mechanism]

Figure 1:
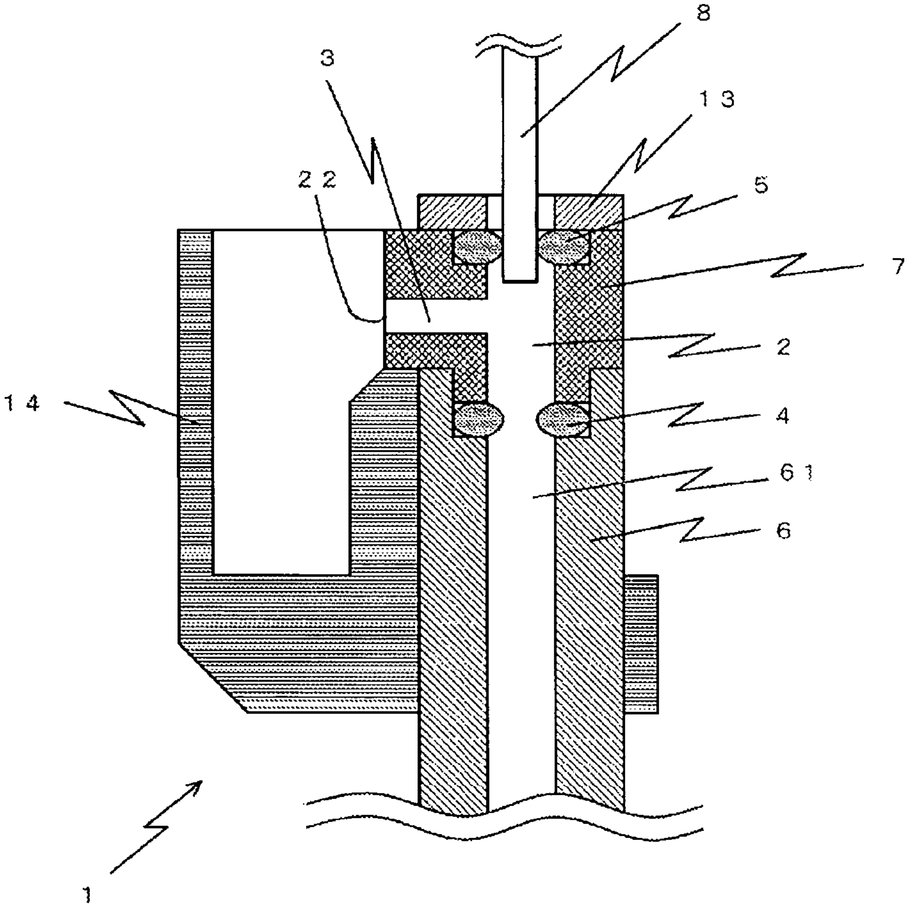
FIG. 1 is an enlarged sectional view of an air bubble ingress prevention mechanism according to the present invention.

FIG. 1 is a sectional view of principal part of an air bubble ingress prevention mechanism according to an embodiment. In FIG. 1, hatched areas represent sectioned surfaces.

An air bubble ingress prevention mechanism 1 is constituted by a body block 7 disposed at an upper end of a metering section 6, a first hole 2 communicated with a metering hole 61 and penetrating through the body block 7, a second hole 3 bored in the body block 7 to be communicated with a side surface of the first hole 2, a first sealing member 4 disposed under the first hole 2, and a second sealing member 5 disposed at an upper end of the first hole 2.

The first hole 2 penetrates through the body block 7 in coaxial relation to the metering hole 61 and has an inner diameter (inner periphery) greater than an outer diameter (outer periphery) of a plunger 8. On the other hand, inner diameters of the sealing members (4, 5) disposed respectively at the upper and lower ends of the first hole 2 are smaller than the inner diameter of the first hole 2 and are substantially the same as the outer diameter of the plunger 8. Stated another way, the plunger 8 slides in close contact with inner peripheral surfaces of the sealing members (4, 5) disposed at both the ends of the first hole 2 without contacting an inner peripheral surface of the first hole 2. With such an arrangement, when the plunger 8 is descended to a position of the first sealing member 4, a cylindrical space a 17 surrounded by respective parts of an inner side surface 9 of the first hole, an outer side surface 10 of the plunger, an outer surface 11 of the first sealing member, and an outer surface 12 of the second sealing member is formed in the first hole 2 (see FIG. 2(*a*)). As described later in connection with the paragraphs of "Air Bubble Ingress Prevention Method", such a space contributes to preventing ingress of air bubbles.

The sealing member used in this embodiment is an O-ring made of rubber or resin. The type and the material of the sealing member can be optionally selected as appropriate depending on durability against a liquid material, a moving speed of the plunger, etc. The first sealing member 4 is fixedly held between the metering section 6 and the body block 7, and the second sealing member 5 is fixedly held between the body block 7 and a seal retaining plate 13.

The second hole 3 is bored in the body block 7 such that its one end is communicated with the first hole 2 at a position between the first sealing member 4 and the second sealing member 5. While the second hole 3 is oriented perpendicularly to the first hole 2 in this embodiment, the second hole 3 may be bored to extend in a direction inclined upwards or downwards. An inner diameter (inner periphery) of the second hole 3 is smaller than an inner diameter (inner periphery) of the first hole 2. An open end 22 of the second hole 3, i.e., one end of the second hole 3 on the opposite side to the other end communicated with the first hole 2, is opened, and a liquid receiving portion 14 is provided in communication with the one end of the second hole 3. The liquid receiving portion 14 serves as a container for receiving a liquid material 20 overflowing from the second hole 3 when the liquid material is filled as described later, to thereby prevent the liquid material from dropping downwards of the air bubble ingress prevention mechanism 1 and a discharge device 25. In this embodiment, an upper surface of the liquid receiving portion 14 is opened.

Figure 2:
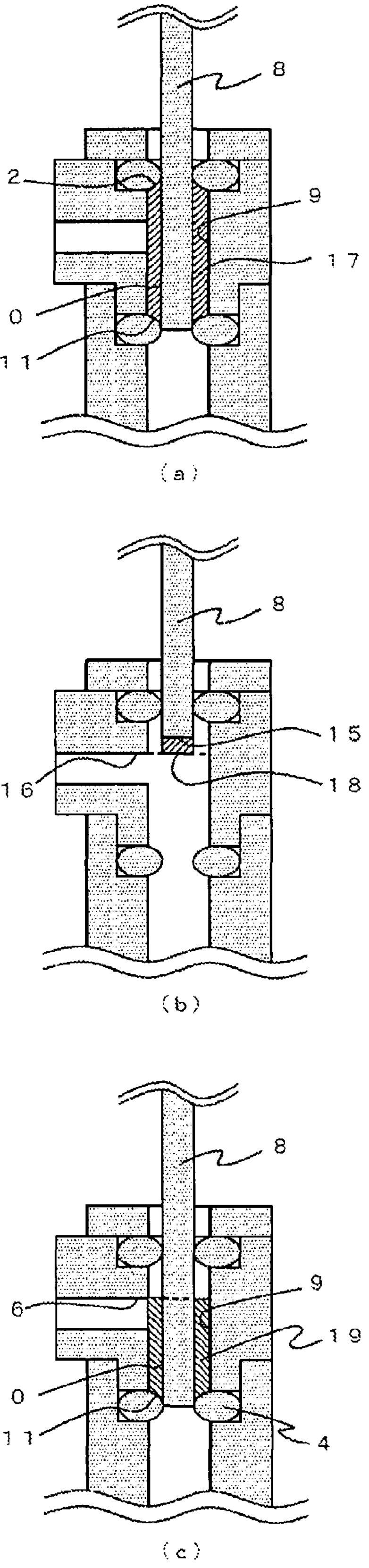
FIG. 2 is an explanatory view to explain states of spaces formed in the air bubble ingress prevention mechanism according to the present invention.

The end of the second hole 3 on the side communicated with the first hole 2 may be disposed at any position between the first sealing member 4 and the second sealing member 5 as long as a space b 18 is smaller than a space c 19. In other words, the position of the second hole 3 is determined such that, in comparing a cylindrically columnar space b 18, which is defined by a fore end surface 15 of the plunger and a horizontal plane at a position of an upper edge 16 of the second hole when the plunger 8 is at a maximally ascended position (most backward position) as illustrated in FIG. 2(*b*), and a cylindrically columnar space c 19, which is defined by the inner side surface 9 of the first hole, the outer side surface 10 of the plunger, a part of the outer surface 11 of the first sealing member, and a plane parallel to the upper edge 16 of the second hole when the plunger 8 is descended to the position of the first sealing member 4 as illustrated in FIG. 2(*c*), the space c 19 has a greater volume than the space b 18. With such an arrangement, as described later in connection with the paragraphs of "Air Bubble Ingress Prevention Method", even when air bubbles remain inside the air bubble ingress prevention mechanism 1, the air bubbles are prevented from entering the metering section 6, which is positioned under the first sealing member 4, when the plunger 8 is descended. Here, the volume of the space c 19 is preferably 1.2 times or more the volume of the space b 18 and more preferably 1.5 times or more.

While the plunger 8 is described as having a cylindrically columnar shape in this embodiment, the shape of the plunger 8 is not limited to such a cylindrical column. For example, the plunger may have a hexagonal columnar shape, or the fore end of the plunger may have a surface other than a flat surface.

Procedures for filling the liquid material into the air bubble ingress prevention mechanism thus constructed will be described below.

[Air Bubble Ingress Prevention Method]

An air bubble ingress prevention method according to this embodiment includes two steps, i.e., a liquid material supply step of supplying the liquid material 20 to the first hole 2 from a reservoir 26 by moving the plunger 8 backwards, and a plunger initial descent step of moving the plunger 8 forwards and preparing a state where the liquid material 20 in the metering section 6 can be discharged.

Figure 3:
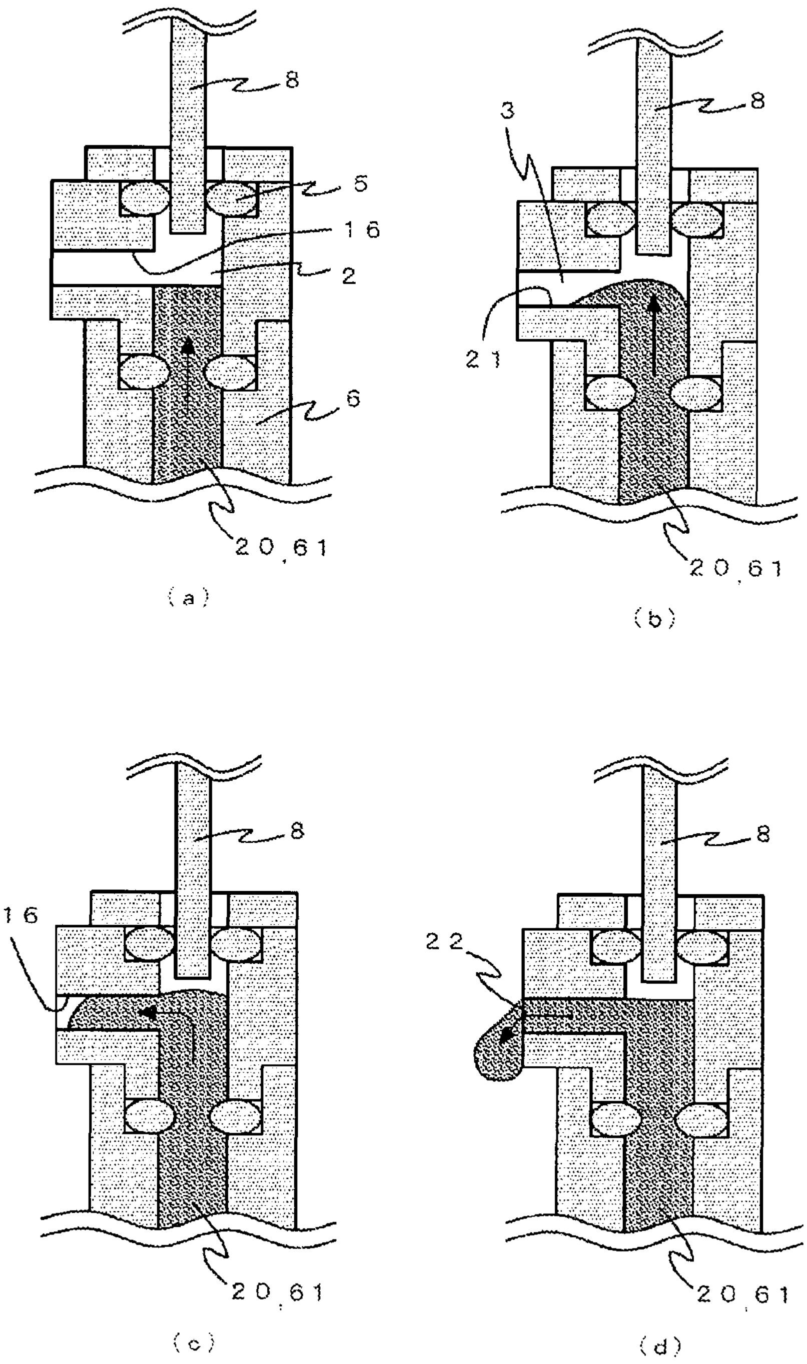
FIG. 3 is an explanatory view to explain a liquid material supply step in an air bubble ingress prevention method according to the present invention.

(1) Liquid Material Supply Step (FIG. 3)

First, the plunger 8 is ascended to a position between the second sealing member 5 and the upper edge 16 of the second hole. That position is defined as the maximally ascended position (most backward position) of the plunger 8. Then, pressure is applied to the reservoir 26 from a compressed gas source 27, thereby feeding the liquid material 20 under pressure to the first hole 2 through the metering hole 61 of the metering section 6 (FIG. 3(*a*)). By continuing the compression transport of the liquid material 20, a liquid surface is ascended and the liquid material 20 starts to flow into the second hole 3 when the liquid surface passes almost a lower edge 21 of the second hole (FIG. 3(*b*)). By further continuing the compression transport, the ascent of the liquid surface is stopped with a gap left relative to the fore end of the plunger when the liquid surface reaches almost the upper edge 16 of the second hole, while the inflow of the liquid material 20 to the second hole 3 is still continued (FIG. 3(*c*)). When the liquid material 20 starts to overflow from the open end 22 of the second hole by further continuing the compression transport, the compression transport is stopped (FIG. 3(*d*)). The compression transport may be stopped by detecting the liquid material 20 with, e.g., a sensor provided in the liquid receiving portion 14. Alternatively, a time taken until the liquid material 20 starts to overflow from the second hole 3 may be measured in advance, and the pressure may be applied for the measured time. With the provision of such a means, the above-described operations can be automated.

Figure 4:
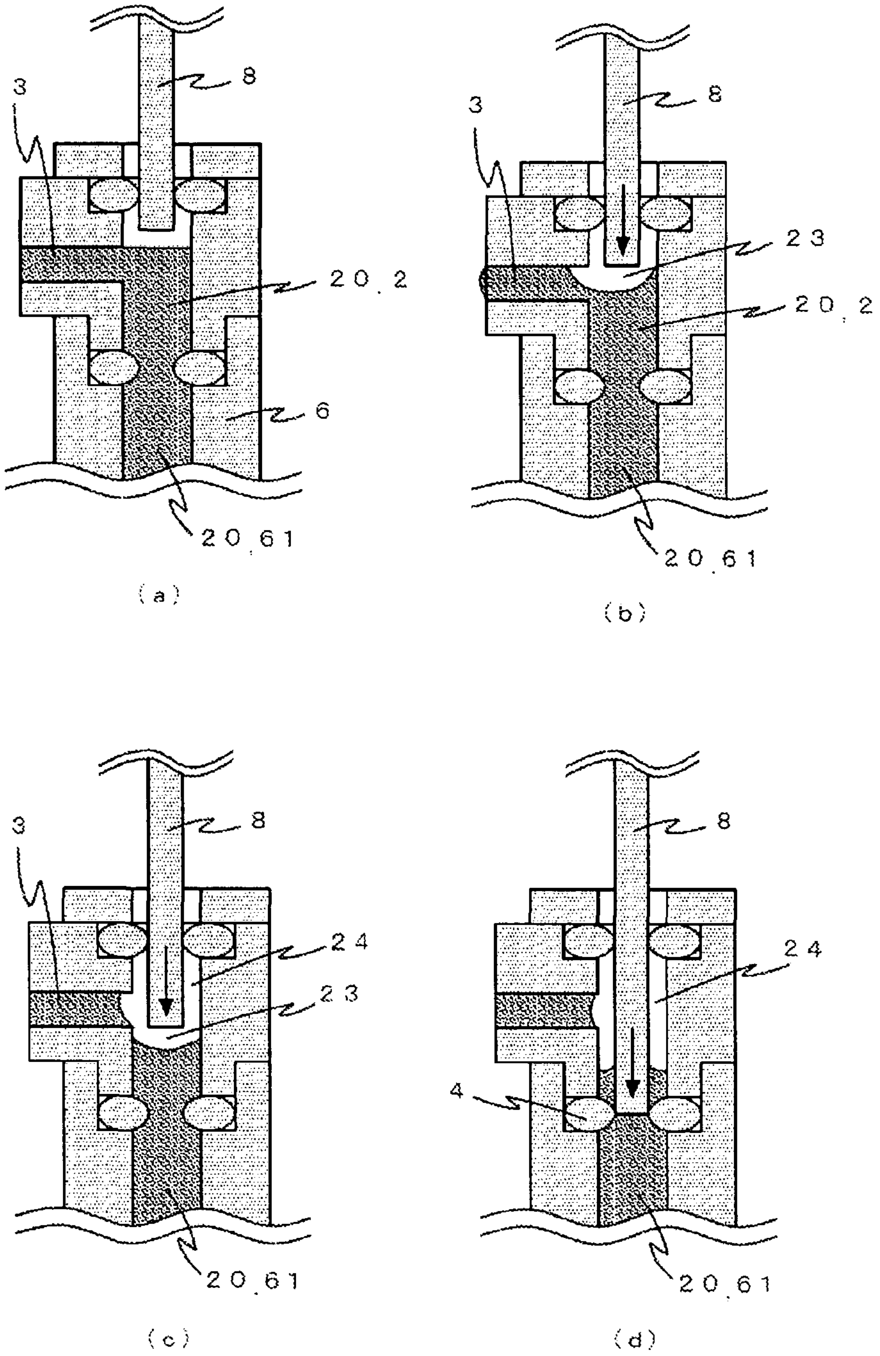
FIG. 4 is an explanatory view to explain a plunger initial descent step in the air bubble ingress prevention method according to the present invention.

(2) Plunger Initial Descent Step (FIG. 4)

After the surface of the liquid material 20 has reached the upper edge 16 of the second hole and the second hole 3 has been entirely filled with the liquid material 20, the plunger 8 is moved forwards to prepare the dischargeable state. When an operation of descending the plunger 8 is started from the state where the filling of the liquid material has been completed as illustrated in FIG. 4(*a*), the plunger 8 is gradually descended within the first hole 2 while pushing air 23 remaining under the fore end of the plunger (FIG. 4(*b*)). At that time, the remaining air 23 is pushed away corresponding to a volume that is displaced by the plunger 8 moving forwards. However, because the second hole 3 is formed in a smaller diameter than the first hole 2, the remaining air 23 is directed downwards toward the first hole 2 where resistance is relatively small. When the plunger 8 is further descended and passes almost the second hole 3, the remaining air 23 present under the fore end of the plunger 8 is caused to shift into a space 24 that is surrounded by the inner surface of the first hole and the outer surface of the plunger, while an amount of the remaining air 23 present under the fore end of the plunger 8 is reduced (FIG. 4(*c*)). With the further descent of the plunger 8, the fore end of the plunger 8 comes into contact with the liquid surface when the space 24 surrounded by the inner surface of the first hole and the outer surface of the plunger is gradually increased and becomes substantially equal to the volume of the space b 18. On that occasion, because the volume of the space c 19 is greater than that of the space b 18, a position at which the fore end of the plunger 8 contacts with the liquid surface is always present short of a position at which the plunger 8 reaches the first sealing member 4. Thereafter, the plunger 8 comes into the liquid material 20 and reaches the first sealing member 4 (FIG. 4(*d*)). This establishes a state where the liquid material in the metering section 6 can be discharged by moving the plunger 8 forwards.

Thus, according to the present invention, since a horizontal sectional area (diameter) of the first hole 2 is set greater than a horizontal sectional area (diameter) of the plunger 8 and the space c 19 is formed to be greater than the space b 18, the remaining air 23 can be caused to shift into the space around the plunger 8 before the plunger reaches the first sealing member 4, whereby the remaining air 23 can be prevented from entering the metering section 6. Further, there is no risk of generation of air bubbles due to a pressure reduction inside the metering hole 61 unlike the known device.

Moreover, since the operation of the plunger 8 is just a simple reciprocal operation, it can be easily automated. In this connection, an initial descent speed of the plunger 8 (i.e., a speed until the plunger reaches the first sealing member 4) is preferably lower than a descent speed during discharge (i.e., a descent speed of the plunger within the metering hole 61). This is because, if the initial descent speed is too fast, there is a risk that the liquid surface may be uselessly waved and air bubbles may be entrained with the fore end of the plunger 8. In a practical example, when the plunger descent speed during discharge is about 10 to 24 mm/s, the initial descent speed is about 1 to 5 mm/s.

The above-described liquid material supply step may be modified such that the plunger initial descent step is started without stopping the compression transport of the liquid material at the end of the liquid material supply step. The reason is that the compression transport generates a flow toward the first hole 2 from the metering hole 61 (i.e., an upward flow) and acts to purge air bubbles which are going to enter the metering hole 61, thus increasing the effect of preventing the ingress of the air bubbles.

The above-described air bubble ingress prevention mechanism according to the present invention requires no additional equipment, such as a vacuum suction device. Further, since the discharge operation including the air bubble ingress prevention method can be automated, it is possible to eliminate variations in the filled state of the liquid material depending on operators.

Details of the present invention will be described in connection with Example, but the present invention is in no way restricted by the following Examples.

Example 1

Discharge Device

Figure 5:
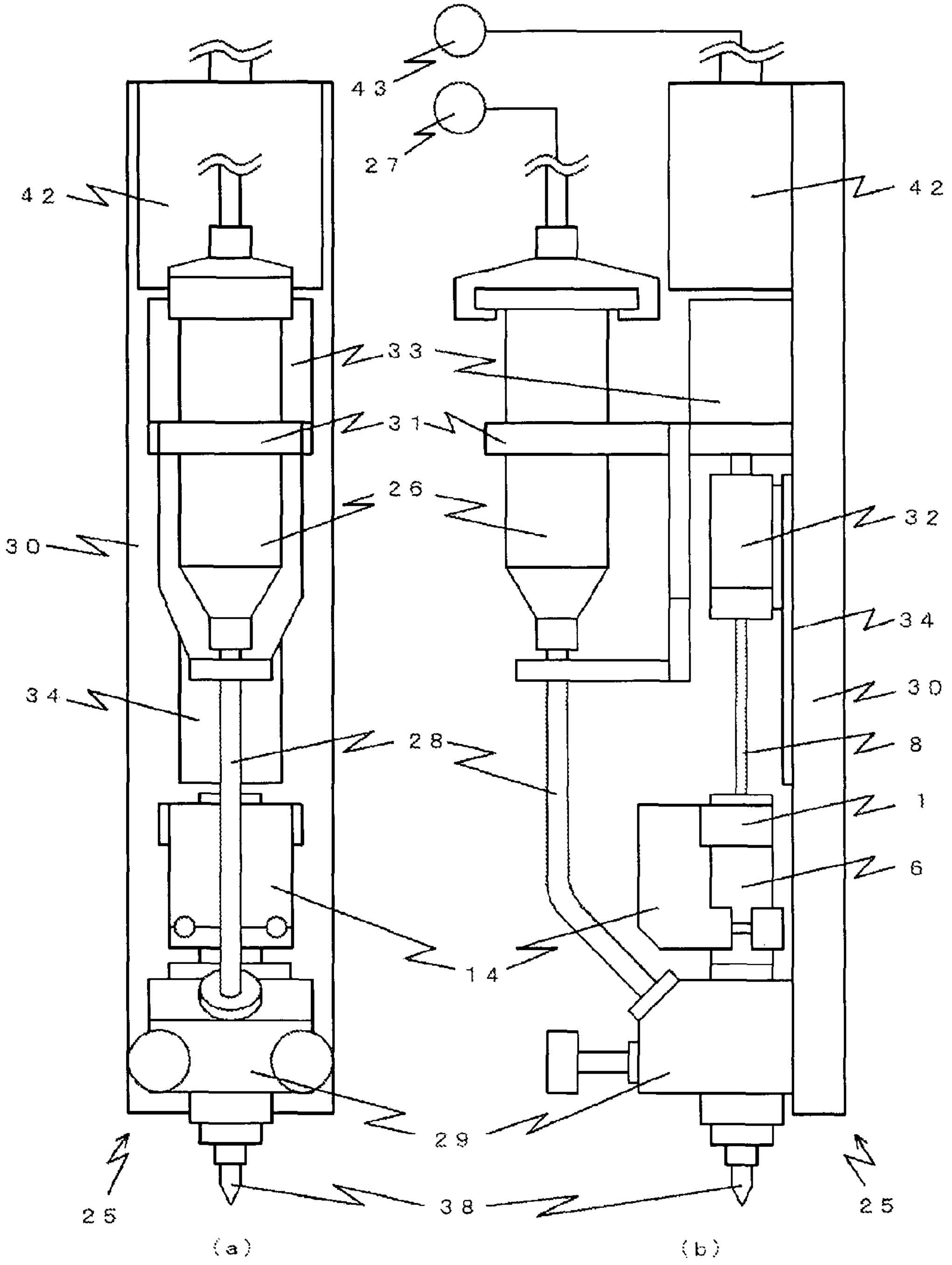
FIG. 5 is a front view and a side view of a discharge device according to Example.
Figure 6:
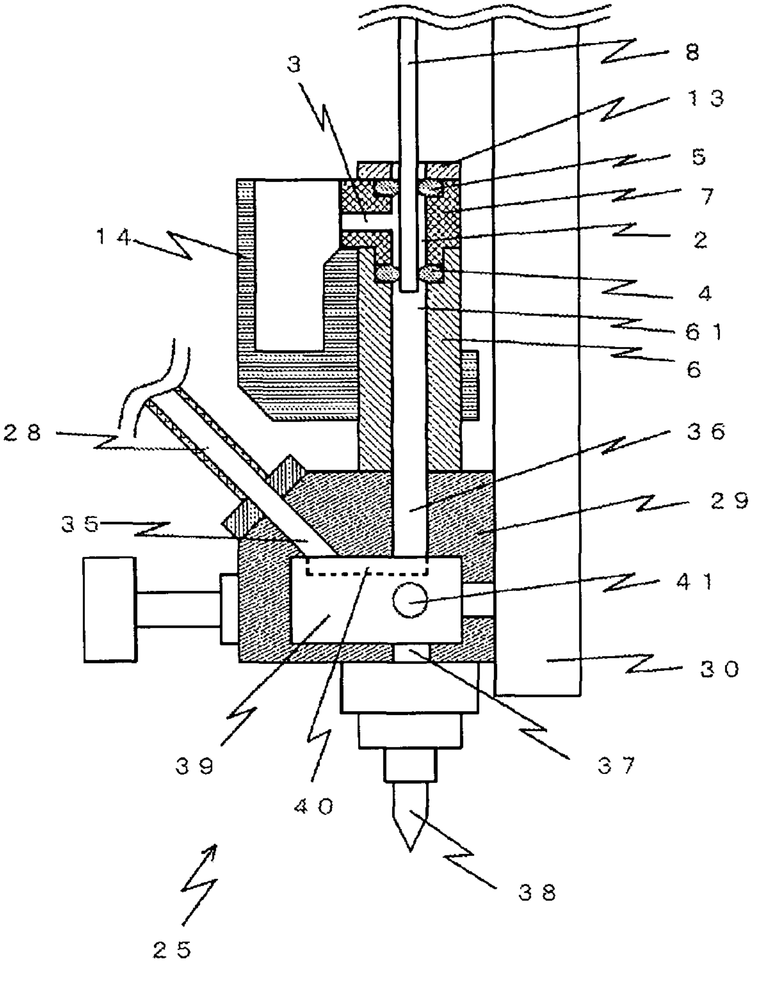
FIG. 6 is a side sectional view of principal part of the discharge device according to Example.

FIGS. 5 and 6 illustrate a discharge device including the air bubble ingress prevention mechanism according to Example 1. FIG. 5(*a*) is a front view of the discharge device, and FIG. 5(*b*) is a side view thereof. Also, FIG. 6 is a sectional view of principal part including the air bubble ingress prevention mechanism and a discharge mechanism. In FIG. 6, hatched areas represent sectioned surfaces.

A discharge device 25 includes a liquid material supply source (syringe 26) for supplying the liquid material 20, the metering section 6 in which the liquid material 20 to be discharged is filled, the plunger 8 movable within the metering section 6 back and forth, a nozzle 38 having a discharge port through which the liquid material 20 is discharged, a selector valve 39 for selectively establishing communication between the liquid material supply source and the metering section 6 or communication between the metering section 6 and the nozzle 38, and the air bubble ingress prevention mechanism 1.

In this Example, the syringe 26 serving as a container storing the liquid material 20 is used as the liquid material supply source. An upper end of the syringe 26 is connected to the compressed gas source 27 for feeding the liquid material 20, which is stored in the syringe 26, to the air bubble ingress prevention mechanism 1 and the metering section 6 under pressure. A lower end of the syringe 26 is connected to a valve block 29 through a piping tube 28. The syringe 26 is fixedly held at two positions, i.e., at a lower end and about a midpoint thereof, by a fixing member 31 that extends from a base plate 30. While the liquid material supply source is constituted as the syringe 26 in this Example, it is not limited to the syringe. For example, the liquid material supply source may be constituted as a tank separately installed near the discharge device 25.

The metering section 6 is formed of a tubular member in which the liquid material 20 to be discharged is filled. The plunger 8 having a diameter smaller than an inner diameter of the metering hole 61 is movable in the vertical direction within the metering hole 61 formed inside the metering section 6. The plunger 8 is connected to a plunger driving mechanism 33 through a coupler 32, and it can be vertically moved with operation of the plunger driving mechanism 33. When the discharge device 25 is operated, the plunger 8 can be moved in a state free from inclination and swing because the coupler 32 is fixedly held on a slide rail 34. In this Example, the plunger driving mechanism 33 is constituted as, e.g., a linear actuator.

The air bubble ingress prevention mechanism 1 is installed at the upper end of the metering section 6. The air bubble ingress prevention mechanism 1 has the same structure as that described above with reference to FIG. 1, and it is constituted by the body block 7, the first hole 2 communicated with the metering hole 61 and penetrating through the body block 7, the second hole 3 bored in the body block 7 to be communicated with the side surface of the first hole 2, the first sealing member 4 disposed under the first hole 2, and the second sealing member 5 disposed at an upper end of the first hole 2. The liquid receiving portion 14 for receiving the liquid material 20 overflowing from the second hole 3 is disposed on the front side of the air bubble ingress prevention mechanism 1. The liquid receiving portion 14 is disposed in partly surrounding relation to the metering section 6. A lower end of the metering section 6 is connected to the valve block 29, and the metering hole 61 is communicated with a second flow passage 36.

As illustrated in FIG. 6, the selector valve 39 is disposed in the valve block 29. Inside the selector valve 39, there are formed a first flow passage 35 communicated with the liquid material supply source, a second flow passage 36 communicated with the metering hole 61, and a third flow passage 37 communicated with the nozzle 38. The selector valve 39 selectively establishes one of communication between the first flow passage 35 and the second flow passage 36 and communication between the second flow passage 36 and the third flow passage 37. The selector valve 39 in this Example is a cylindrically columnar member. A recessed groove 40 for communicating the first flow passage 35 and the second flow passage 35 with each other is formed in the surface of the selector valve 39 to extend in a direction parallel to a center axis thereof, and a through-hole 41 is bored in the selector valve 39 to extend from one side surface thereof to the other side surface on the opposite side while passing the center axis in a direction perpendicular to the center axis. The flow passages to be communicated with each other are optionally selected by rotating the selector valve 39 with a valve driving mechanism 42. It is to be noted that the selector valve 39 is not limited to a cylindrically columnar member, and it may be the type sliding a plate-like member in which the recessed groove 40 and the through-hole 41 are formed side by side.

The selector valve driving mechanism 42 may be constituted as, e.g., a rotary actuator or a motor. In this Example, the selector valve driving mechanism 42 and the selector valve 39 are coupled with each other through a power transmission mechanism (not shown). Thus, the selector valve driving mechanism 42 can be disposed at a place away from the selector valve 39 in combined relation to the plunger driving mechanism 33, etc. The power transmission mechanism (not shown) can be installed in a groove that is formed in the base plate 30, and it is constituted by using, e.g., a chain or a belt (see Patent Document 3, filed by the applicant, for details of construction providing the valve driving mechanism and the plunger driving mechanism in combined relation by using the power transmission mechanism). Here, the construction of the valve driving mechanism 42 is not limited to the mechanism described above as Example 1, and the selector valve driving mechanism 42 may be installed near the selector valve 39 to directly drive the selector valve 39 without using any power transmission mechanism.

The selector valve driving mechanism 42 and the plunger driving mechanism 33 are connected to a power source 43 for driving the various mechanisms. The power source 43 can be constituted as, e.g., a pressure gas source or an electric power supply corresponding to the types of those mechanisms.

The discharge device 25 includes a control unit (not shown) for controlling the operations of the above-described devices. The control unit controls, e.g., the magnitude and the application time of pressure supplied from the compressed gas source 27, the distance and the speed by and at which the plunger 8 is moved, and the switching operation of the valve 39.

[Discharge Operation]

The discharge device 25 having the above-described construction operates as follows.

(1) Initial Filling Operation

First, the syringe 26 filled with the liquid material 20 is connected to the metering section 6, which is in an empty state, and to the selector valve 39. Then, the plunger 8 is moved backwards to a position between the second sealing member 5 and the upper edge 16 of the second hole inside the air bubble ingress prevention mechanism 1 (see FIG. 3(*a*)). Further, the selector valve 39 is rotated to switch over its selective position such that the first flow passage 35 and the second flow passage 36 are communicated with each other through the recessed groove 40 of the selector valve 39. Subsequently, supply of the compressed gas from the compressed gas source 27, which is connected to the syringe 26, is started to feed the liquid material 20 under pressure. The liquid material 20 is fed to the air bubble ingress prevention mechanism 1 from the piping tube 28 through the first flow passage 35, the recessed groove 40, the second flow passage 36, and the metering hole 61. Upon the liquid material 20 overflowing from the open end 22 of the second hole in the air bubble ingress prevention mechanism 1, the supply of the compressed gas from the compressed gas source 27 is stopped and the compression transport of the liquid material is stopped. The plunger 8 is then moved forwards to be inserted into the first sealing member 4 in the air bubble ingress prevention mechanism 1. The initial filling operation is thereby completed.

(2) Discharge Operation

After the end of the initial filling operation, the selector valve 39 is rotated to switch over its selective position such that the second flow passage 36 and the third flow passage 37 are communicated with each other through the through-hole 41 of the selector valve 39. Then, the plunger 8 is moved forwards by a predetermined distance in match with the desired discharge amount, whereby the liquid material 20 is discharged from the nozzle 38 in amount corresponding to the distance by which the plunger 8 has been moved forwards. On that occasion, immediately after the end of the initial filling operation, the liquid material 20 is not yet fed to the flow passages extending from the selector valve 39 up to the nozzle 38. In view of such a situation, the discharge is started subsequent to an operation of filling the liquid material 20 into the flow passages up to the nozzle 38 by descending the plunger 8 until the liquid material 20 is discharged from the nozzle 38, after moving the nozzle to a place away from a application target 49 or placing, e.g., a container for receiving the extra liquid material 20.

(3) Ordinary Filling Operation

With the continued discharge operation, when the plunger 8 is descended to a predetermined position and the required amount of the liquid material 20 is no longer present within the metering hole 61, an operation of filling the liquid material 20 into the metering section 6 again is performed.

First, the selector valve 39 is rotated to switch over its selective position such that the first flow passage 35 and the second flow passage 36 are communicated with each other through the recessed groove 40 of the selector valve 39. Then, the supply of the compressed gas from the compressed gas source 27, which is connected to the syringe 26, is started and the plunger 8 is moved backwards. The liquid material 20 is gradually filled into the metering section 6 with not only a pressure reduction caused by the backward movement of the plunger, but also the pressure applied by the supply of the compressed gas. A speed of the plunger 8 during the backward movement at that time is preferably equal to the speed (e.g., about 1 to 5 mm/s) in the initial filling operation. When the plunger 8 reaches a position under the first sealing member 4 in the air bubble ingress prevention mechanism 1, the movement of the plunger 8 is stopped and the supply of the compressed gas is stopped. The ordinary filling operation is thereby completed.

The discharge is performed by repeating the operations of above (2) and (3) until the liquid material 20 in the syringe 26 is depleted.

Example 2

Applying Apparatus

Figure 7:
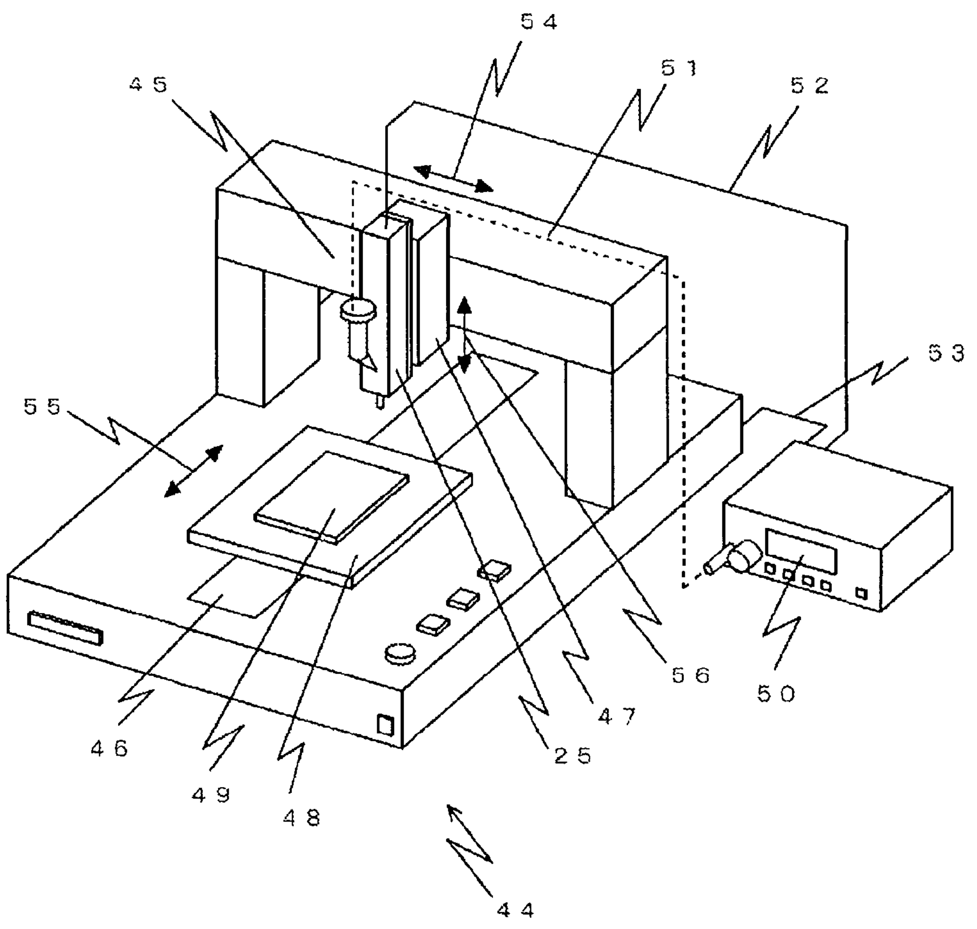
FIG. 7 is a schematic perspective view illustrating an applying apparatus that includes the discharge device according to Example.
Figure 8:
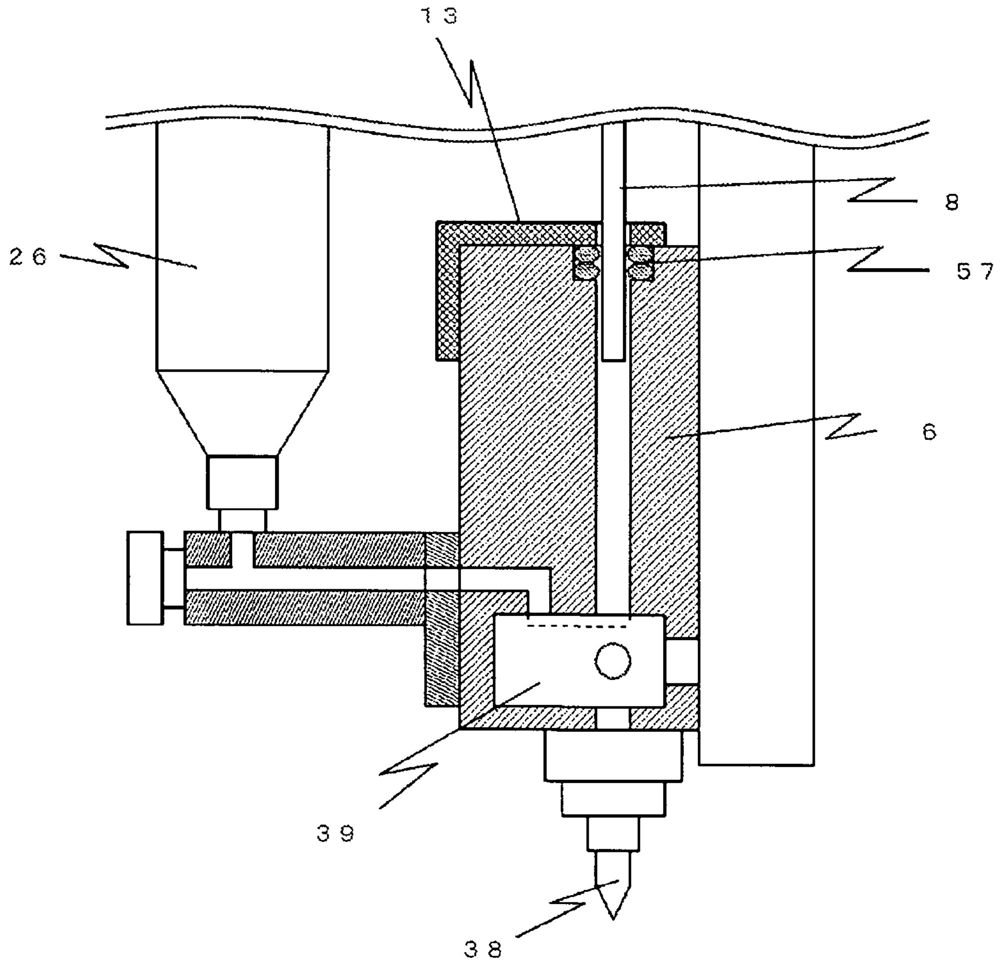
FIG. 8 is a sectional view of principal part of a known plunger type discharge device.

FIG. 7 illustrates an applying apparatus including the discharge device according to Example 1.

An applying apparatus 44 according to Example 2 includes an X-driving mechanism 45 movable in directions denoted by a reference symbol 54, a Y-driving mechanism 46 movable in directions denoted by a reference symbol 55, and a Z-driving mechanism 47 movable in directions denoted by a reference symbol 56. The discharge device 25 is mounted to the Z-driving mechanism 47, and the Z-driving mechanism 47 is mounted to the X-driving mechanism 45. Further, a table 48 on which an application target 49 is placed is mounted to the Y-driving mechanism 46. With the provision of the driving mechanisms described above, the discharge device 25 can be relatively moved in the XYZ-directions (54, 55, 56) with respect to the application target 49.

Under control by a control unit 50, the compressed gas for feeding the liquid material 20 under pressure is supplied to the discharge device 25 through a compressed gas line 51, and power for driving the plunger and the valve is supplied through a power line 52. Further, the control unit 50 can control the amount of the discharged liquid material by controlling, e.g., the distance and the speed by and at which the plunger 8 of the discharge device 25 is moved. In addition, since the control unit 50 is connected to respective control units (not shown) of the XYZ-driving mechanisms through a control line 53, the liquid material can be discharged in accordance with the operations of the XYZ-driving mechanisms (45, 46, 47).

LIST OF REFERENCE SYMBOLS

1 air bubble ingress prevention mechanism/2 first hole/3 second hole/4 first sealing member/5 second sealing member/6 metering section/7 body block/8 plunger/9 inner side surface of first hole/10 outer side surface of plunger/11 outer surface of first sealing member/12 outer surface of second sealing member/13 seal retaining plate/14 liquid receiving portion/15 fore end surface of plunger/16 upper edge of second hole/17 space a/18 space b/19 space c/20 liquid material/21 lower edge of second hole/22 open end of second hole/23 remaining air/24 space surrounded by inner surface of first hole and outer surface of plunger/25 discharge device/26 reservoir, syringe/27 compressed gas source/28 piping tube/29 valve block/30 base plate/31 fixing member/32 coupler/33 plunger driving mechanism/34 slide rail/35 first flow passage/36 second flow passage/37 third flow passage/38 nozzle/39 selector valve/40 recessed groove/41 through-hole/42 selector valve driving mechanism/43 power source/44 applying apparatus/45 X-driving mechanism/46 Y-driving mechanism/47 Z-driving mechanism/48 table/49 application target/50 control unit (of discharge device)/51 compressed gas line/52 power line/53 control line/54 X-moving direction/55 Y-moving direction/56 Z-moving direction/57 sealing member/61 metering hole

The invention claimed is:

1. An air bubble ingress prevention mechanism mountable to a discharge device including a metering section having a flow passage communicating with a nozzle and a plunger reciprocally movable in the flow passage of the metering section, at an end of the discharge device on the opposite side from the nozzle, the air bubble ingress prevention mechanism comprising:

- a first hole communicating with the flow passage of the metering section and allowing the plunger to reciprocally move therein,
- a first sealing member disposed at an end of the first hole on the side closer to the nozzle,
- a second sealing member disposed at an end of the first hole on the opposite side from the nozzle, and
- a second hole communicating with a side surface of the first hole,
- wherein inner peripheries of the first and second sealing members are substantially equal in size to an outer periphery of the plunger, and
- wherein outer peripheries of the first and second sealing members are greater than an inner periphery of the first hole.

2. The air bubble ingress prevention mechanism according to claim 1, wherein the inner periphery of the first hole is greater than the outer periphery of the plunger.

3. The air bubble ingress prevention mechanism according to claim 1, wherein an inner periphery of the second hole is smaller than the inner periphery of the first hole.

4. The air bubble ingress prevention mechanism according to claim 1, further comprising a liquid receiving portion at an end of the second hole on the opposite side from the first hole.

5. The air bubble ingress prevention mechanism according to claim 1,

- wherein a space b is defined by a fore end of the plunger and a horizontal plane at a position of an upper edge of an end of the second hole on the side communicating with the first hole, when the plunger is at a most backward position,
- wherein a space c is defined by an inner peripheral surface of the first hole, an outer peripheral surface of the plunger, an outer peripheral surface of the first sealing member, and the horizontal plane at the position of the upper edge of the end of the second hole on the side communicating with the first hole, when the plunger is at a position in contact with the first sealing member, and
- wherein the space c is greater than the space b.

6. The air bubble ingress prevention mechanism according to claim 5, wherein the volume of the space c is 1.2 times or more the volume of the space b.

7. The air bubble ingress prevention mechanism according to claim 5, wherein the volume of the space c is 1.5 times or more the volume of the space b.

8. A liquid material discharge device, comprising:

- a liquid material supply source for supplying a liquid material;
- a metering section including a flow passage communicating with a nozzle;
- a plunger reciprocally movable in the flow passage of the metering section, the nozzle having a discharge port through which the liquid material is discharged;

air bubble ingress prevention mechanism comprising a first hole communicating with the flow passage of the metering section and allowing the plunger to reciprocally move therein, a first sealing member disposed at an end of the first hole on the side closer to the nozzle, a second sealing member disposed at an end of the first hole on the opposite side from the nozzle, and a second hole communicating with a side surface of the first hole, and a selector valve for selectively establishing communication between (i) the liquid material supply source and the metering section, and (ii) the metering section and the nozzle.

9. A liquid material discharge method using the liquid material discharge device according to claim 8, the method comprising:

filling the liquid material into the metering section, and discharging the liquid material in the metering section from the nozzle, wherein the filling includes:

moving the plunger backwards to a position between the position of the upper edge of the end of the second hole on the side communicating with the first hole and the second sealing member;

supplying the liquid material to the metering section at least until the liquid material overflows from an end of the second hole on the opposite side from the first hole; and moving the plunger forwards until the plunger comes into contact with the first sealing member.

10. The liquid material discharge method according to claim 9, wherein the moving the plunger forwards during the filling is executed without stopping the supplying of the liquid material.

11. The liquid material discharge method according to claim 9, wherein a speed at which the plunger is moved forwards during the filling is lower than a speed at which the plunger is moved forwards in the discharging.

12. The air bubble ingress prevention mechanism according to claim 8, wherein an inner periphery of the first hole is greater than an outer periphery of the plunger.

13. The air bubble ingress prevention mechanism according to claim 8, wherein inner peripheries of the first and second sealing members are substantially equal in size to an outer periphery of the plunger, and wherein outer peripheries of the first and second sealing members are greater than an inner periphery of the first hole.

14. The air bubble ingress prevention mechanism according to claim 8, wherein an inner periphery of the second hole is smaller than an inner periphery of the first hole.

15. The air bubble ingress prevention mechanism according to claim 8, further comprising a liquid receiving portion at an end of the second hole on the opposite side from the first hole.

16. The air bubble ingress prevention mechanism according to claim 8, wherein a space b is defined by a fore end of the plunger and a horizontal plane at a position of an upper edge of an end of the second hole on the side communicating with the first hole, when the plunger is at a most backward position, wherein a space c is defined by an inner peripheral surface of the first hole, an outer peripheral surface of the plunger, an outer peripheral surface of the first sealing member, and the horizontal plane at the position of the upper edge of the end of the second hole on the side communicating with the first hole, when the plunger is at a position in contact with the first sealing member, and wherein the space c is greater than the space b.

17. The air bubble ingress prevention mechanism according to claim 16, wherein the volume of the space c is 1.2 times or more the volume of the space b.

18. The air bubble ingress prevention mechanism according to claim 16, wherein the volume of the space c is 1.5 times or more the volume of the space b.

* * * * *